(12) United States Patent
Ehrlich et al.

(10) Patent No.: US 7,721,049 B2
(45) Date of Patent: May 18, 2010

(54) DISK DRIVE WRITE METHOD

(75) Inventors: Richard M. Ehrlich, Saratoga, CA (US); Fernando A. Zayas, Loveland, CO (US)

(73) Assignee: Kabuhsiki Kaisha Toshiba, Minatoku (JP)

( * ) Notice: Subject to any disclaimer, the term of this patent is extended or adjusted under 35 U.S.C. 154(b) by 160 days.

(21) Appl. No.: 11/390,966

(22) Filed: Mar. 27, 2006

(65) Prior Publication Data

US 2007/0226411 A1 Sep. 27, 2007

(51) Int. Cl.
G06F 12/00 (2006.01)

(52) U.S. Cl. .............. 711/135; 711/113; 711/E12.103

(58) Field of Classification Search .......... 711/133, 711/135
See application file for complete search history.

(56) References Cited

U.S. PATENT DOCUMENTS

| | | | |
|---|---|---|---|
| 4,549,232 A | 10/1985 | Axmear | |
| 4,614,986 A | 9/1986 | La Budde | |
| 4,706,250 A | 11/1987 | Patel et al. | |
| 4,811,124 A | 3/1989 | Dujari et al. | |
| 4,829,249 A | 5/1989 | Matsushita | |
| 4,833,679 A | 5/1989 | Anderson et al. | |
| 4,881,136 A | 11/1989 | Shiraishi et al. | |
| 4,993,029 A | 2/1991 | Galbraith et al. | |
| 5,068,858 A | 11/1991 | Blaum et al. | |
| 5,109,304 A | 4/1992 | Pederson | |
| 5,150,050 A | 9/1992 | Genheimer et al. | |
| 5,267,241 A | 11/1993 | Kowal | |
| 5,339,204 A | 8/1994 | James et al. | |
| 5,424,638 A | 6/1995 | Huber | |
| 5,444,719 A | 8/1995 | Cox et al. | |
| 5,455,536 A | 10/1995 | Kono et al. | |
| 5,487,077 A | 1/1996 | Hassner et al. | |
| 5,532,586 A | 7/1996 | Ishikawa | |
| 5,563,746 A | 10/1996 | Bliss | |
| 5,568,331 A | 10/1996 | Akagi et al. | |
| 5,615,064 A | 3/1997 | Blank et al. | |
| 5,630,054 A * | 5/1997 | Trang | 714/52 |
| 5,659,436 A | 8/1997 | Chainer et al. | |
| 5,663,846 A | 9/1997 | Masuoka et al. | |
| 5,751,947 A | 5/1998 | Arakawa | |

(Continued)

FOREIGN PATENT DOCUMENTS

EP 769774 4/1997

(Continued)

OTHER PUBLICATIONS

Al Mamun, A., et al., "Efficient position encoding in hard disk drive using dual frequency servo bursts", *The 27th Annual Conference of the IEEE Industrial Electronics Society, 2001, IECON '01*. vol. 1, (2001),609-614.

(Continued)

*Primary Examiner*—Reginald G Bragdon
*Assistant Examiner*—Aracelis Ruiz
(74) *Attorney, Agent, or Firm*—Schwegman, Lundberg & Woessner, P.A.

(57) ABSTRACT

A disk drive includes a first flush cache memory location, a second flush cache memory location, and a controller for writing information associated with a flush cache write command alternatively between the first flush cache memory location and the second flush cache memory location.

19 Claims, 7 Drawing Sheets

U.S. PATENT DOCUMENTS

| | | | |
|---|---|---|---|
| 5,781,363 | A | 7/1998 | Rowan et al. |
| 5,792,947 | A | 8/1998 | Pogrebinsky et al. |
| 5,815,338 | A | 9/1998 | Tsunekawa et al. |
| 5,867,341 | A | 2/1999 | Volz et al. |
| 6,057,926 | A | 5/2000 | Horai |
| 6,081,112 | A | 6/2000 | Carobolante et al. |
| 6,091,564 | A | 7/2000 | Codilian et al. |
| 6,101,227 | A | 8/2000 | Glover |
| 6,175,459 | B1 | 1/2001 | Tomita |
| 6,195,220 | B1 | 2/2001 | Ellis et al. |
| 6,198,584 | B1 | 3/2001 | Codilian et al. |
| 6,204,629 | B1 | 3/2001 | Rote et al. |
| 6,204,989 | B1 | 3/2001 | Hryina et al. |
| 6,219,814 | B1 | 4/2001 | Coker et al. |
| 6,243,224 | B1 | 6/2001 | Sacks et al. |
| 6,259,576 | B1 | 7/2001 | Ahn |
| 6,292,316 | B1 | 9/2001 | Dietzel et al. |
| 6,292,913 | B1 | 9/2001 | Son |
| 6,363,214 | B1 | 3/2002 | Merello et al. |
| 6,411,459 | B1 | 6/2002 | Belser et al. |
| 6,429,995 | B1 | 8/2002 | Dobbek et al. |
| 6,469,849 | B1 | 10/2002 | Ellis et al. |
| 6,490,111 | B1 | 12/2002 | Sacks |
| 6,519,107 | B1 | 2/2003 | Ehrlich et al. |
| 6,522,488 | B2 | 2/2003 | Sasamoto et al. |
| 6,608,477 | B2 | 8/2003 | Sacks et al. |
| 6,631,046 | B2 | 10/2003 | Szita et al. |
| 6,643,082 | B1 | 11/2003 | Belser |
| 6,651,213 | B2 | 11/2003 | Hassner et al. |
| 6,704,156 | B1 | 3/2004 | Baker et al. |
| 6,725,395 | B2 * | 4/2004 | Ono et al. ............ 714/8 |
| 6,760,179 | B2 | 7/2004 | Moon et al. |
| 6,760,184 | B1 | 7/2004 | Cunningham |
| 6,785,075 | B2 | 8/2004 | Bryant et al. |
| 6,785,084 | B2 | 8/2004 | Szita |
| 6,883,066 | B2 * | 4/2005 | Herbst et al. ............ 711/118 |
| 6,885,514 | B1 | 4/2005 | Codilian et al. |
| 6,906,884 | B2 | 6/2005 | Yasuna |
| 6,928,518 | B2 * | 8/2005 | Talagala ............ 711/135 |
| 6,940,679 | B1 | 9/2005 | McNeil et al. |
| 6,943,977 | B2 | 9/2005 | Yatsu |
| 6,961,203 | B1 | 11/2005 | Baker |
| 6,988,165 | B2 * | 1/2006 | White et al. ............ 711/113 |
| 7,023,631 | B2 | 4/2006 | Zhang et al. |
| 7,076,605 | B1 * | 7/2006 | Son ............ 711/113 |
| 7,130,962 | B2 * | 10/2006 | Garney ............ 711/113 |
| 7,523,264 | B1 * | 4/2009 | Danilak ............ 711/135 |
| 2001/0019463 | A1 | 9/2001 | Drouin |
| 2002/0141101 | A1 | 10/2002 | Brittner et al. |
| 2003/0065469 | A1 | 4/2003 | Pedrazzini et al. |
| 2003/0161065 | A1 | 8/2003 | Yatsu |
| 2003/0179482 | A1 | 9/2003 | Fukushima |
| 2003/0189781 | A1 | 10/2003 | Dunn |
| 2003/0214747 | A1 | 11/2003 | Baral |
| 2004/0061968 | A1 | 4/2004 | Fukushima et al. |
| 2004/0075935 | A1 | 4/2004 | Yatsu |
| 2004/0114270 | A1 | 6/2004 | Chung et al. |
| 2004/0123025 | A1 | 6/2004 | Chainer et al. |
| 2004/0145825 | A1 | 7/2004 | Miles |
| 2004/0201914 | A1 | 10/2004 | Ikeda et al. |
| 2004/0264019 | A1 | 12/2004 | Curtiss et al. |
| 2004/0264031 | A1 | 12/2004 | Yatsu |
| 2005/0013037 | A1 | 1/2005 | Tanner |
| 2005/0052767 | A1 | 3/2005 | Miyata |
| 2005/0071583 | A1 * | 3/2005 | Shepherd ............ 711/154 |
| 2005/0073770 | A1 | 4/2005 | Ehrlich et al. |
| 2005/0078403 | A1 | 4/2005 | Mizukoshi |
| 2005/0082996 | A1 | 4/2005 | Luebbe |
| 2005/0099720 | A1 | 5/2005 | Chung |
| 2005/0117240 | A1 | 6/2005 | Codilian et al. |
| 2005/0117245 | A1 | 6/2005 | Park et al. |
| 2005/0152058 | A1 | 7/2005 | Schmidt |
| 2005/0174679 | A1 | 8/2005 | Chan et al. |
| 2005/0207051 | A1 | 9/2005 | Fukushima |
| 2005/0218853 | A1 | 10/2005 | Kokami |
| 2005/0237646 | A1 | 10/2005 | Ehrlich |
| 2005/0237653 | A1 | 10/2005 | Ehrlich |
| 2005/0237656 | A1 | 10/2005 | Ehrlich |
| 2005/0237658 | A1 | 10/2005 | Ehrlich |
| 2005/0237659 | A1 | 10/2005 | Ehrlich |
| 2005/0248872 | A1 | 11/2005 | Ehrlich |
| 2005/0254160 | A1 | 11/2005 | Bandic et al. |
| 2006/0015683 | A1 * | 1/2006 | Ashmore et al. ............ 711/113 |
| 2006/0236034 | A1 * | 10/2006 | Pomaranski et al. ............ 711/118 |
| 2007/0070829 | A1 * | 3/2007 | Sato et al. ............ 369/30.23 |

FOREIGN PATENT DOCUMENTS

| | | |
|---|---|---|
| EP | 962915 | 12/1999 |
| GB | 2361576 | 10/2001 |
| JP | 62188015 | 8/1987 |
| JP | 63211116 | 9/1988 |
| JP | 3214474 | 9/1991 |
| JP | 2001014486 | 1/2001 |
| JP | 2002288956 | 10/2002 |
| JP | 2005352536 | 12/2002 |
| JP | 2003008590 | 1/2003 |
| JP | 2003085904 | 3/2003 |
| JP | 2005174429 | 6/2005 |
| JP | 2005190509 | 7/2005 |
| WO | WO-9741558 | 11/1997 |

OTHER PUBLICATIONS

Al Mamun, A., et al., "Measurement of position offset in hard disk drive using dual frequency servo bursts", *IEEE Transactions on Instrumentation and Measurement*, 52(6), (2003),1870-1880.

Gurumurthi, Sudhanva, et al., "DRPM: Dynamic Speed Control for Power Management in Server Class Disks", *Proceedings of the 30th Annual International Symposium on Computer Architecture*, (2003),169-181.

Hughes, E C., et al., "Characterization of three servo patterns for position error signal generation in hard drives", *Proceedings of the 2003 American Control Conference*, (Jun. 2003),4317-4322.

Matsuoka, Kaoru, "Servo track writing of HDDs using magnetic printing technology", *JSME News*, 16(1);, The Japan Society of Mechanical Engineers; http://www.jsme.or.jp/English/news09(450KB).pdf,(2005),1-10.

Sacks, Alexei, "Positive error signal generation in magnetic disk drives", (*Presentation*)—*PhD Thesis of Alexel Sacks, Carnegie-Mellon University*, (1995),1-37.

Schultz, M D., et al., "A self-servowrite clocking process", *IEEE Transactions on Magnetics*, 37(4), http://ieeexplore.ieee.org/xpl/abs_free.jsp?arNumber=950996,(Jul. 2001),1878-1880.

Sereinig, W., "Motion control: the power side of disk drives", *Proceedings of the International Conference on Computer Design: VLSI in Computers & Processors*, (2001),1-6.

Takaishi, K., et al., "Hard disk drive servo technology for media-level servo track writing", *IEEE Transactions on Magnetics*, 39(2);, http://ieeexplore.ieee.org/xpl/abs_free.jsp?arNumber=1190113,(Mar. 2003),851-856.

Ye, Haibei, et al., "Radial error propagation issues in self-servo track writing technology", *IEEE Transactions on Magnetics*, 38(5); http://ieeexplore.ieee.org/xpl/abs_free.jsp?arNumber=1042130, (Sep. 2002),2180-2182.

* cited by examiner

DISK DRIVE WRITE METHOD

BACKGROUND

A disk drive is an information storage device. A disk drive includes one or more disks clamped to a rotating spindle, and at least one head for reading information representing data from and/or writing data to the surfaces of each disk. More specifically, storing data includes writing information representing data to portions of tracks on a disk so that it can be subsequently read and retrieved. Disk drives associated with a computing system generally execute write commands from a host computer. By the time a write command from a host computer passes through a read/write channel of the disk drive, the write command includes specific information including the location on the disk where the specific information will be written. Executing write commands as they arrive can be done. However, many times it is not necessary to write information to the disk immediately since most of the time data to be written does not immediately need to be read. In addition, a majority of the time a disk drive is in operation, it is reading information representing data. Switching from reading information to writing information during read operations each time a write command is received would be time consuming, inefficient, and many times, would adversely effect performance of the disk drive. As a result, the host or the disk drive will store or group individual write commands in a write cache, rather than write each of the commands as they arrive. When the write cache is full or at a selected time, a command is given to empty the write cache of the write commands. The command is also called a Flush-Cache command.

In response to the Flush-Cache command, the disk drive writes the data associated with the write commands to the designated specific locations on the disk of the disk drive. When all the write commands have been written to their designated locations, the disk drive informs the host computer that the Flush-Cache command is complete.

Various performance parameters are used to measure the speed of a disk drive. One of the performance parameters is how fast the disk drive responds to write commands. Some of the performance tests for writing include a response time for completing one or more Flush-Cache commands. Determining a way to quickly respond to a Flush-Cache command or multiple Flush-Cache commands can enhance one of the performance factors associated with a disk drive. Of course, the response must insure that the data is stored and can be read back in all or most circumstances since losing data negatively how a user of a disk drive perceives the disk drive. Therefore, the data written in response to a Flush-Cache command must be retrievable even if a power outage, sudden acceleration of the disk drive, or a similar event occurs in the middle of executing the Flush-Cache command or shortly after signaling that the Flush-Cache command is complete.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

Figure 1:
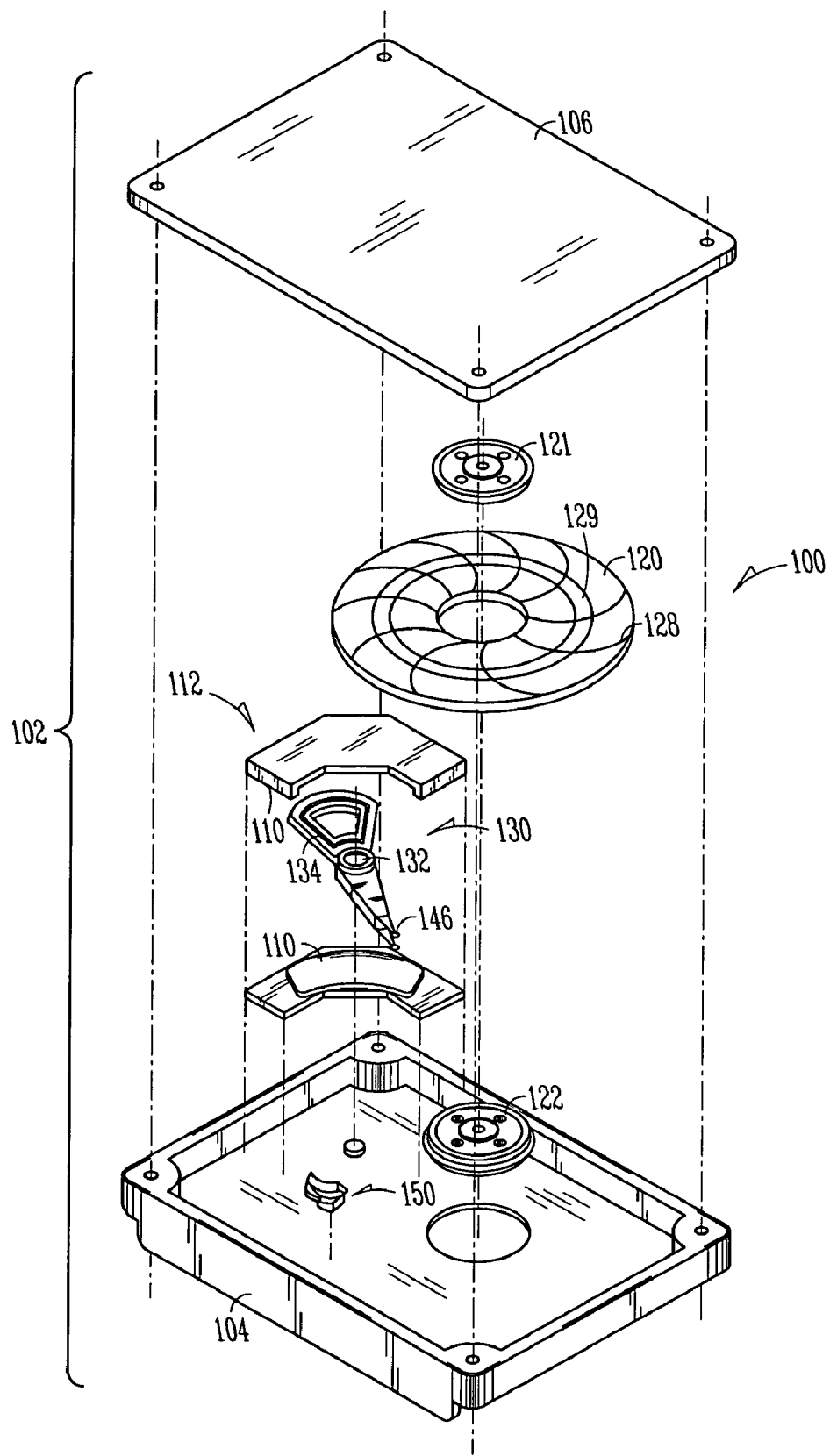
FIG. 1 is an exploded view of a disk drive that uses example embodiments described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system (shown in FIG. 4) that uses positioning data read by the transducing head 146 from the disk 120 to determine the position of the head 146 over one of a plurality of tracks on the disk 120. The servo system determines an appropriate current to drive through the voice coil 134, and drives the current through the voice coil 134 using a current driver and associated circuitry (not shown in FIG. 1).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is an embedded, servo system in which tracks on each disk surface used to store information representing data contain small segments of servo information. The servo information, in some embodiments, is stored in radial servo sectors or servo wedges shown as several narrow, somewhat curved spokes 128 substantially equally spaced around the circumference of the disk 120. It should be noted that in actuality there may be many more servo wedges than as shown in FIG. 1. The servo wedges 128 are further detailed in FIGS. 2 and 7 and in the discussions associated with those FIGs.

The disk 120 also includes a plurality of tracks on each disk surface. The plurality of tracks is depicted by two tracks, such as track 129 on the surface of the disk 120. The servo wedges 128 traverse the plurality of tracks, such as track 129, on the disk 120. The plurality of tracks, in some embodiments, may be arranged as a set of substantially concentric circles. Data is stored in fixed sectors along a track between the embedded servo wedges 128. The tracks on the disk 120 each include a plurality of data sectors. More specifically, a data sector is a portion of a track having a fixed block length and a fixed data storage capacity (e.g. 512 bytes of user data per data sector). The tracks toward the inside of the disk 120 are not as long as the tracks toward the periphery of the disk 110. As a result, the tracks toward the inside of the disk 120 can not hold as many data sectors as the tracks toward the periphery of the disk 120. Tracks that are capable of holding the same number of data sectors are grouped into a data zones. Since the density and data rates vary from data zone to data zone, the servo wedges 128 may interrupt and split up at least some of the data sectors. The servo sectors 128 are typically recorded with a servo writing apparatus at the factory (called a servo-writer), but may be written (or partially written) with the disk drive's 100 transducing head 146 in a self-servowriting operation.

Figure 2:
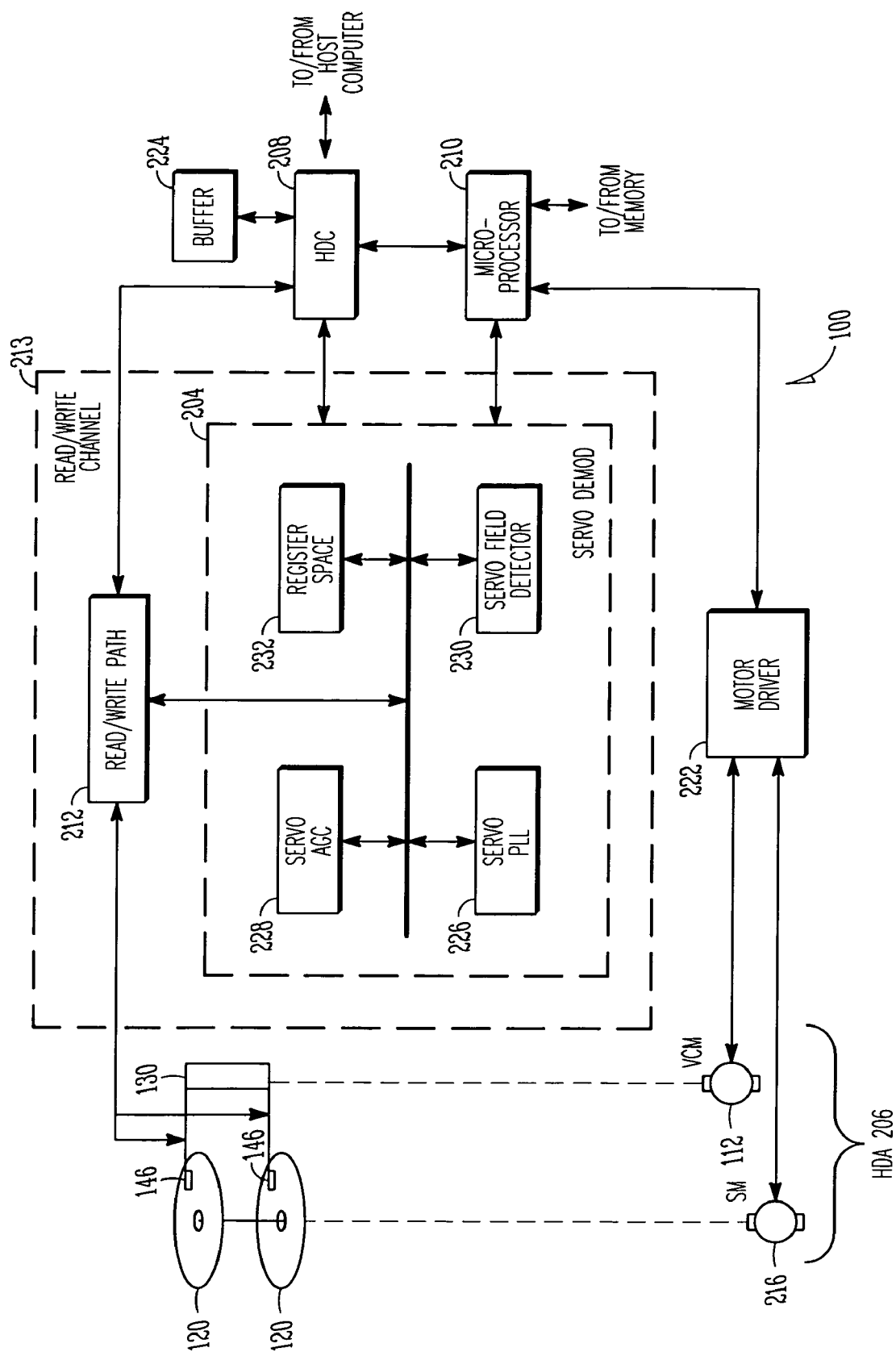
FIG. 2 is a schematic diagram of a disk drive and includes various electrical portions of the disk drive, according to an example embodiment.

The disk drive 100 not only includes many mechanical features and a disk with a servo pattern thereon, but also includes various electronics for reading signals from the disk 120 and writing information representing data to the disk 120. FIG. 2 is a schematic diagram of a disk drive 100 that more-fully details some of example electronic portions of the disk drive 100, according to an-example embodiment. Referring to FIG. 2, the disk drive device 202 is shown as including a head disk assembly (HDA) 206, a hard disk controller (HDC) 208, a read/write channel 213, a microprocessor 210, a motor driver 222 and a buffer 224. The read/write channel 213 is shown as including a read/write path 212 and a servo demodulator 204. The read/write path 212, which can be used to read and write user data and servo data, may include front end circuitry useful for servo demodulation. The read/write path 212 may also be used for writing servo information in self-servowriting. It should be noted that the disk drive 100 also includes other components, which are not shown because they are not necessary to explain the example embodiments.

The HDA 206 includes one or more disks 120 upon which data and servo information can be written to, or read from, by transducers or transducing heads 146. The voice coil motor (VCM) 112 moves an actuator 130 to position the transducing heads 146 on the disks 110. The motor driver 222 drives the VCM 112 and the spindle motor (SM) 216. More specifically, the microprocessor 210, using the motor driver 222, controls the VCM 112 and the actuator 130 to accurately position the heads 146 over the tracks (described with reference to FIGS. 1-3) so that reliable reading and writing of data can be achieved. The servo fields 128, discussed above in the description of FIGS. 1-3, are used for servo control to keep the heads 146 on track and to assist with identifying proper locations on the disks 120 where data is written to or read from. When reading a servo-wedge 128, the transducing heads 146 act as sensors that detect the position information in the servo wedges 128, to provide feedback for proper positioning of the transducing heads 146.

The servo demodulator 204 is shown as including a servo phase locked loop (PLL) 226, a servo automatic gain control (AGC) 228, a servo field detector 230 and register space 232. The servo PLL 226, in general, is a control loop that is used to provide frequency and phase control for the one or more timing or clock circuits (not shown in FIG. 2), within the servo demodulator 204. For example, the servo PLL 226 can provide timing signals to the read/write path 212. The servo AGC 228, which includes (or drives) a variable gain amplifier, is used to keep the output of the read/write path 212 at a substantially constant level when servo wedges 128 on one of the disks 120 are being read. The servo field detector 230 is used to detect and/or demodulate the various subfields of the servo wedges 128, including the SAM 204, the track number 206, the first phase servo burst 210, and the second phase servo burst 220. The microprocessor 210 is used to perform various servo demodulation functions (e.g., decisions, comparisons, characterization and the like), and can be thought of as being part of the servo demodulator 204. In the alternative, the servo demodulator 204 can have its own microprocessor.

One or more registers (e.g., in register space 232) can be used to store appropriate servo AGC values (e.g., gain values, filter coefficients, filter accumulation paths, etc.) for when the read/write path 212 is reading servo data, and one or more registers can be used to store appropriate values (e.g., gain values, filter coefficients, filter accumulation paths, etc.) for when the read/write path 212 is reading user data. A control signal can be used to select the appropriate registers according to the current mode of the read/write path 212. The servo AGC value(s) that are stored can be dynamically updated. For example, the stored servo AGC value(s) for use when the read/write path 212 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 212 includes the electronic circuits used in the process of writing and reading information to and from disks 120. The microprocessor 210 can perform servo control algorithms, and thus, may be referred to as a servo controller. Alternatively, a separate microprocessor or digital signal processor (not shown) can perform servo control functions.

Figure 3:
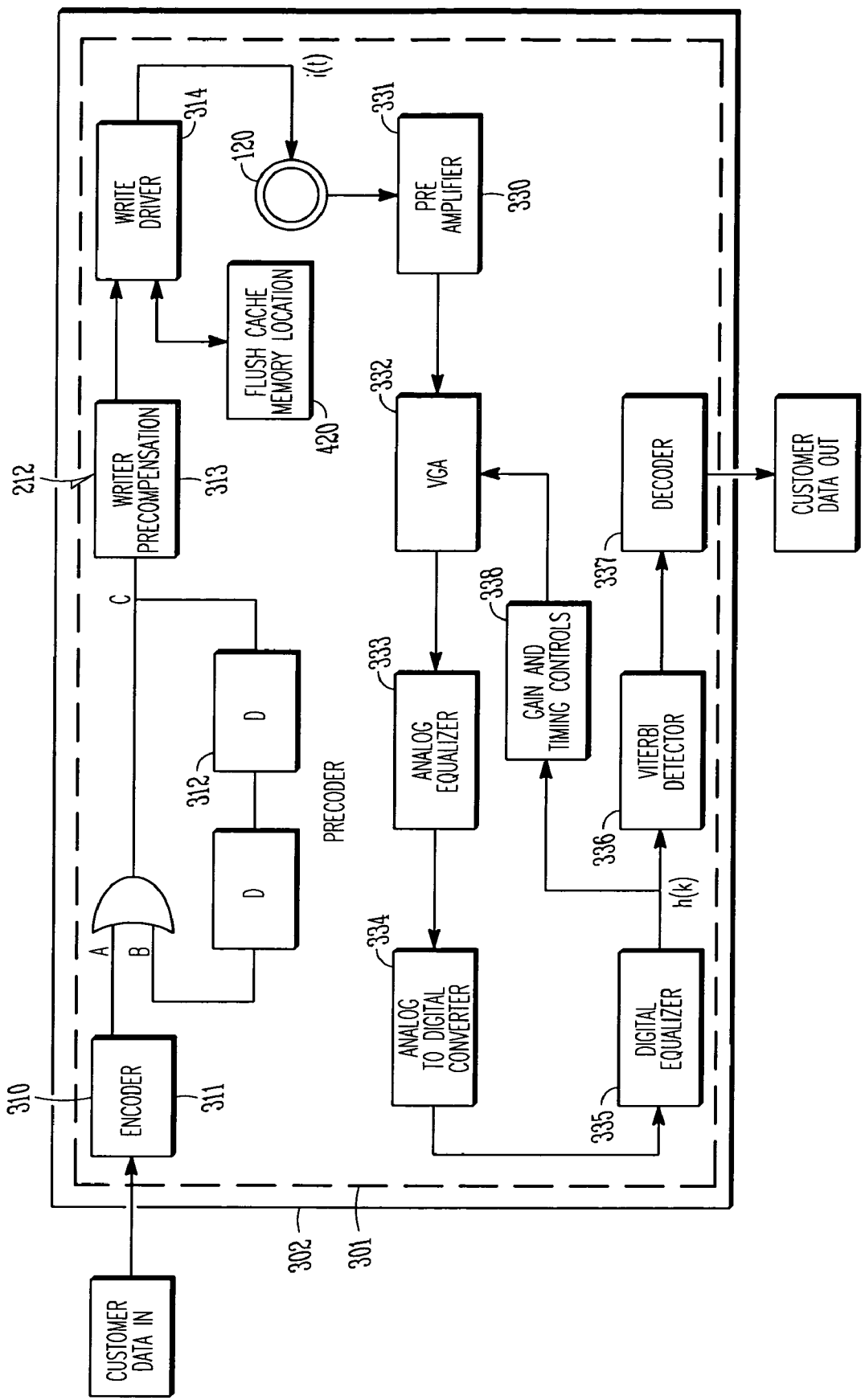
FIG. 3 is a schematic diagram showing portions of the read/write path of FIG. 2, according to an example embodiment.

FIG. 3 is a schematic diagram further detailing the read/write path 212 of FIG. 2, according to an example embodiment. The read/write path 212 includes a write channel portion 310 and a read channel portion 330. The read/write path 212 is typically housed on a semiconductor chip, as depicted by the dotted line 301. The semiconductor chip is also placed on a printed circuit board 302, which is in turn attached to the housing 104 of the disk drive 100 (see FIG. 1). This is shown schematically in FIG. 3 so the size of the chip or semiconductor chip 301 relative to the printed circuit board 302 is out of scale. The read/write path 212 is typically contained in a semiconductor chip called a encoder/decorder (ENDEC). The read/write path 212 includes the write portion 310, which includes an encoder 311 and a precoder 312 for encoding the customer data, a write precompensation module 313, and a write driver 314. The write precompensation module 313 adjusts the signals associated with the encoded data so that, as written on the disk 120, the data will be more easily read using the read channel 330. The write driver 314 determines where the data will be written. In this particular embodiment, the data can either be written to a flush cache memory location 420 or to the disk 120 of the disk drive 100 (see FIG. 1). As will be discussed and described below, the flush cache memory location 420 can either be remote from the disk 120 or can be on the disk 120. The flush cache memory location 420 (shown in FIG. 3) is a schematic representation of the flush cache memory location and can include writing data to the disk 120 or to a memory location remote from the disk 120.

The read portion 330 of the read/write path includes a preamplifier 331, a variable gain amplifier 332, an analog equalizer 333, and an analog to digital converter 334. The elements 331 to 334 are used to amplify an analog signal, equalize it and convert it to a digital signal. After being converted from analog to digital converter 334, the signal is then placed into a digital equalizer 335, and then to a viterbi detector 336, and finally decoded by the a decoder 337. The signal from the digital equalizer 335 is also fed to a gain and timing control 338, which is part of a feedback control loop to the variable gain amplifier 332. It should be noted that FIG. 3 is one representative example of a read/write path 212. Read/write paths 212 can either be analog based or digitally based. The invention is equally applicable to either type of read/write path 212.

Figure 4:
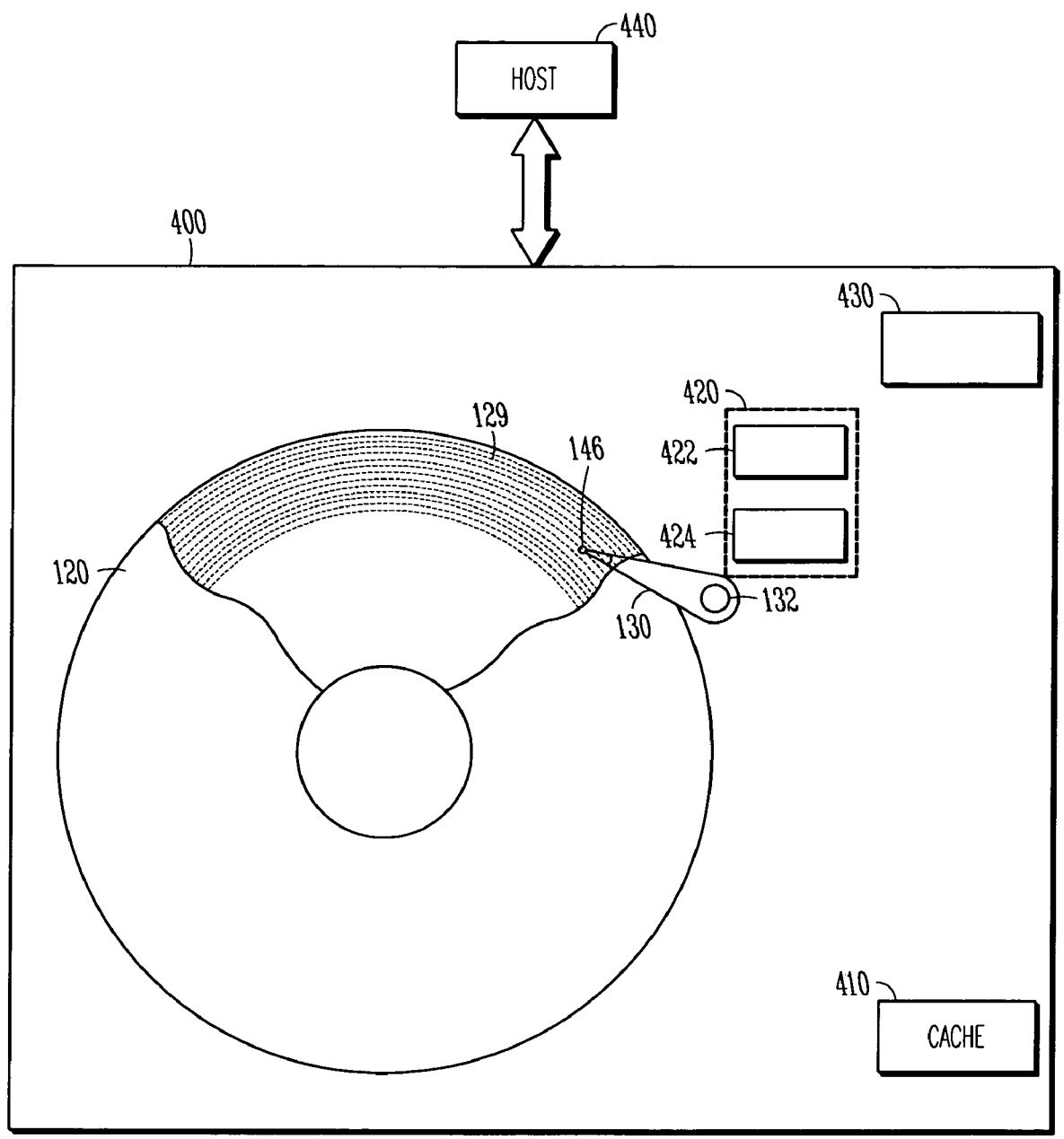
FIG. 4 is an schematic view of a disk drive that includes a plurality of flush cache memory locations, according to an example embodiment.

FIG. 4 is a schematic view of a disk drive 400 that includes a cache 410, a flush cache memory location 420, and a controller 430. In the embodiment of the invention shown in FIG. 4, the cache memory location actually includes two flush cache memory locations 422 and 424. The flush cache memory location 420 is a non volatile memory, such an EEPROM or another non volatile type memory. The non volatile memory is a storage medium whose contents remain unaltered when power is switched off to the memory. In other words, the information stored in non volatile memory is available when power is restored to the memory or storage medium. The two flush cache memory locations 422, 424 can either be two locations associated with a single non volatile memory or single EEPROM. In another example embodiment, the two flush cache memory locations 422, 424 can be separate non volatile memory chips, such as two separate EEPROMs. It should also be noted that the flush cache memory location 420 is not limited to just two flush cache memory locations, such as flush cache memory locations 422 and 424. In other example embodiments, additional flush cache memory locations may be provided.

The cache 410 includes an area for storing write commands received from the host as well as information read from the disk of the disk drive that the host 440 may request from the disk drive 400. Thus, the cache 410 can be thought of as having a write cache portion for storing write commands received from the host computer 440 and can also be thought of as having a read portion which stores information retrieved from the disk or disk drive. Of import is that the cache 410 is separate from the cache memory locations 422, 424; The host 440 can issue a "flush cache" and "flush-cache command" to the disk drive 400.

The host computer 440 will send a flush-cache command to the disk drive 400 to assure that the data that it has sent out to the disk drive which may be in the write cache portion of the cache 410 has been securely written to the media, so that even if the host computer 440 or the disk drive 400 suffers a power-loss, the data will be recoverable. When the disk drive 400 signals a successful completion of the "flush-cache" command it assures the host computer 400 that the corresponding data is recoverable by the host 440. In response to the "flush-cache" command, the controller 430 of the disk drive 400 controls the writing of the information from the cache 410 to the first non volatile memory location 422 or the second non volatile memory location 424. The controller writes the information from the cache 410 to the non volatile memory in a manner to assure that the data is recoverable from the disk drive 400.

It should be noted, that even after signaling successful completion of the "flush-cache" command, the disk drive 400 is likely to retain some or all of the data in a read portion of the cache 410, because the host 440 may request the same data in a subsequent read command. Obtaining the data from the read cache 410 is faster than reading it back from the media. The drive 400 will lose the data in the read portion of the cache 410 as soon as additional information, such as additional new data that it reads from other locations on the media, are placed in the cache.

Figure 5:
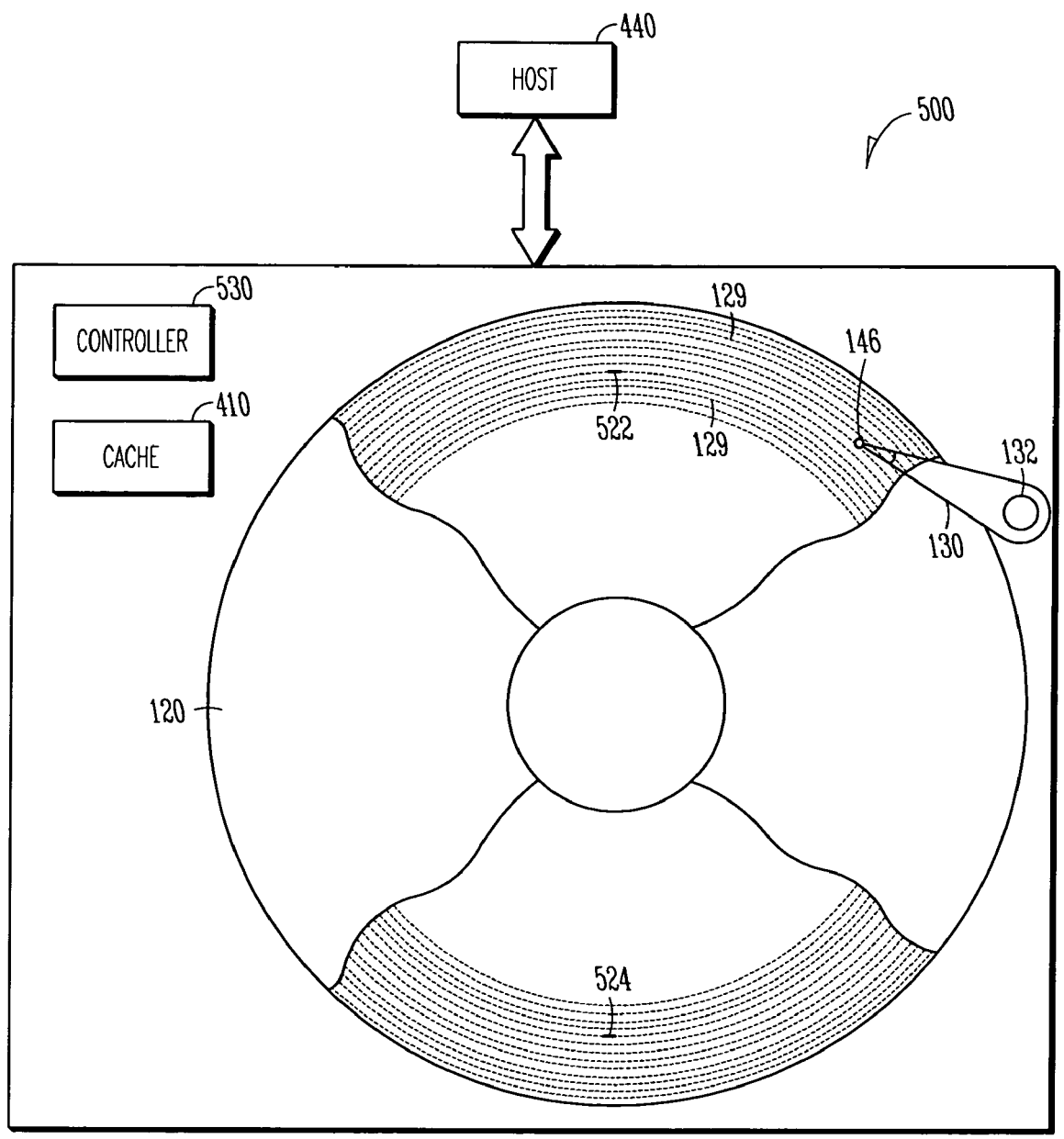
FIG. 5 is a representation of a disk having at least a first flush cache memory location and a second flush cache memory location, according to an example embodiment.

FIG. 5 is a representation of a disk 120 having a first flush cache memory location 522 and a second flush cache memory location 524, according to an example embodiment. The disk 120 includes a plurality of tracks, such as track 129. The flush memory location 522 and the flush memory location 524, in one embodiment, may be located on the same track such as track 129. It is not necessary to have each of the flush cache memory locations 522 and 524 to be located on the same track 129. In other embodiments of the invention, the flush cache memory locations 522, 524 can be located on different tracks of the disk drive. Also as shown in FIG. 5, the flush cache memory location 522 is on the opposite side of the disk 120 from the flush cache memory location 524. Although this may provide certain advantages, such as the flush cache memory location 522 being 180 degrees away from the flush cache memory 524 so that two flush cache commands from the host 440 (see FIG. 4) can be more easily handled in a single revolution, it is not a requirement that the flush cache memory locations 522, 524 on the disk be at opposite sides of the disk or 180 degrees away from one another. The flush cache memory locations 522 and 524 are non volatile memory locations. In other words, if a flush cache command is responded to and all of the write commands within the cache 410 are written to the disk 120 at one of the flush cache memory locations 522, 524, the information associated with the flush cache memory command will be retrievable even if the power is shut off or removed from the disk drive 400.

Of course, the flush cache memory location is written to using the write portion 310 of the read/write path 212. The flush cache memory locations 522, 524 are written by the transducer 146, which is positioned over the surface of the disk 120 by a rotary actuator 130 mounted to a bearing 132. The transducer 146 may also be referred to as a transducing head or head 146. The disk drive 500 also includes a controller 530 which controls writing information associated with the flush write command from the host 440. Specifically, the controller 530 controls the writing of the write commands from the cache 410 to the flush cache memory locations 522, 524 on the disk 120.

Figure 6:
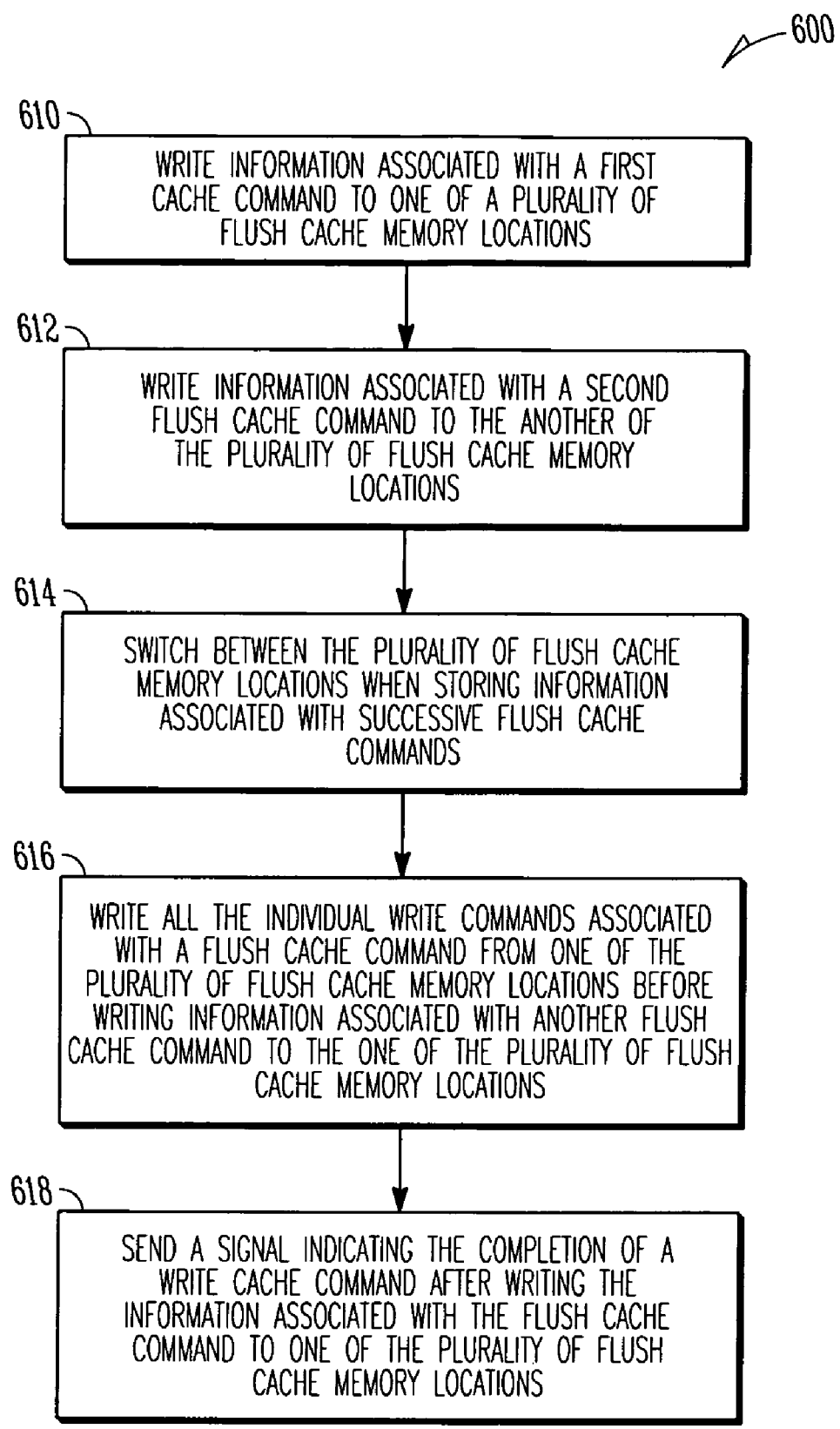
FIG. 6 is a flow diagram of a method of writing data to the disk, according to an example embodiment.

FIG. 6 is a flow diagram of a method 600 of writing data to the disk 120, according to an example embodiment. The method 600 of writing information associated with a flush cache command to a disk drive includes writing information associated with a first cache command to one of a plurality of flush cache memory locations 610, and writing information associated with a second flush cache command to the another of the plurality of flush cache memory locations 612. The method 600 also includes switching between the plurality of flush cache memory locations when storing information associated with successive flush cache commands 614. The method 600 includes writing all the individual write commands associated with a flush cache command from one of the plurality of flush cache memory locations before writing information associated with another flush cache command to the one of the plurality of flush cache memory locations 616. The writing of the individual write commands can be done after returning a complete signal to the host in response to the "flush-cache" command. In some embodiments, the plurality of flush cache memory locations corresponds to a number N. The information associated with a flush cache command includes at least one write command to be written to a specific location on a disk of a disk drive. The method includes writing individual write commands designated by a flush cache command to specific locations on the disk before receiving N additional flush cache commands. The method 600 also includes sending a signal indicating the completion of a write cache command 618 after writing the information associated with the flush cache command to one of the plurality of flush cache memory locations. The plurality of flush cache memory locations are non volatile memory locations. In some embodiments, the plurality of flush cache memory locations are located on the disk of a disk drive. The disk drive controller 430, 530 will write the individual write commands from the cache memory location at times when the disk drive is not fulfilling other commands. It should be noted that the individual write commands are generally completed in a relatively short time after signaling a complete to the flush cache command from the host.

A disk drive 400, 500 includes a first flush cache memory location 422, 522, a second flush cache memory location 424, 524, and a controller 430, 530 for writing information associated with a flush cache write command alternatively between the first flush cache memory location 422, 522 and the second flush cache memory location 424, 524. The first flush cache memory location 422, 522 and the second flush cache memory location 424, 524 are non volatile memory locations. In one embodiment, the non volatile memory locations 422, 424 are located remote from a disk of the disk drive. In another embodiment, the non volatile memory locations 420 are a portion of a write channel 310 associated with the disk drive. In some embodiments, the disk drive 100 includes a printed circuit board 302 attached to an enclosure or housing 104 of the disk drive 100. The non volatile memory locations 422 are located on the printed circuit board 302. The non volatile memory locations 422, 424 can be two portions of a single non volatile memory device 420.

In still another embodiment, the first flush cache memory location 522 and the second flush cache memory location 524 are located on a disk 120 of the disk drive 500. In one embodiment, the first flush cache memory location 522 and the second flush cache memory location 524 are located on a track 129 of a disk 120 of the disk drive 500. In another embodiment, the first flush cache memory location 522 and the second flush cache memory location 524 are located on substantially opposite sides of a disk 120 on the disk drive 500.

The controller 430 in the disk drive 500 or the controller 530 in the disk drive 500 controls the writing of the information associated with the flush write commands from the host 440. In one embodiment of the invention, the controller 430, 530 carries out the portion of the method 600 that includes switching between plurality of flush cache memory locations when storing information associated with successive flush cache commands 614. The controller 430, 530 maintains either a state machine, a switch, a flip flop, a flag or a register that can be incremented with each successive response to a flush cash command. Depending upon the state of the state machine, the flip flop, the state of the flip flop, whether a flag is enabled or is set or not or the number within the register, the controller will direct writing of the information associated with a flush cache command to one of the plurality of flush cache memory locations. For example, in disk drive 400 the controller 430 controls the writing of information associated with a flush cache command to either non volatile memory location 422 or 424. In the disk drive 500 the controller 530 directs writing of information associated with a flush cache command to one of the flush cache memory locations 522, 524 on the disk 120. It is important that successive flush cache commands and the information associated with that flush cache command is written to a different flush cache memory location. By assuring that the information associated with successive flush write commands is sent to different or alternative flush cache memory locations, such as 422 or 424 or 522 or 524, the disk drive and host computer can be assured that the data corresponding to the flush write command is recoverable by the host through the disk drive. If successive writes associated with successive flush write cache commands are not written to alternative locations, then there is a possibility that data associated with a previous flush write command could be lost. In other words, if the information associated with a first flush write cache command is written to a flush cache memory location and then all the write commands associated with the flush cache write cache memory command are not written to the specific locations on the disk before a next flush write cash command is received at the same flush cache memory location, there is a possibility that the next or successive information could over write the information previously stored before that information is actually written out to the specific locations on the disk drive disk. The controller 430, 530, therefore acts as a toggle switch to direct information associated with successive flush write commands to be written to different non volatile flush cache memory locations (422, 424, 522, 524).

In other example embodiments, there may be more than two non volatile memory locations designated as flush cache memory locations. In these other embodiments, the controller 430, 530 will not simply be able to act as a toggle switch but will have to include additional hardware to switch amongst the plurality or multiplicity of flush cache memory locations. For example, if there are four flush cache memory locations a two bit designation will be needed in order to direct writing of information to various flush cache memory locations.

It should be noted that when the flush cache memory locations 422, 424 located remote from the disk 120, as shown in FIG. 4, the response for completion of a flush write command is typically given more quickly since the information does not have to pass through the read/write path 212 to be written on the disk 120. Thus, the remotely located flush cache memory locations 422, 424 may give performance enhancements to the disk drive due to the quicker response to completion of flush write commands from the host 440. In addition, it should be understood that flush cache memory locations 422, 424 are not necessarily limited to an EEPROM type non volatile memory. Other types of non volatile memory can also be used.

Figure 7:
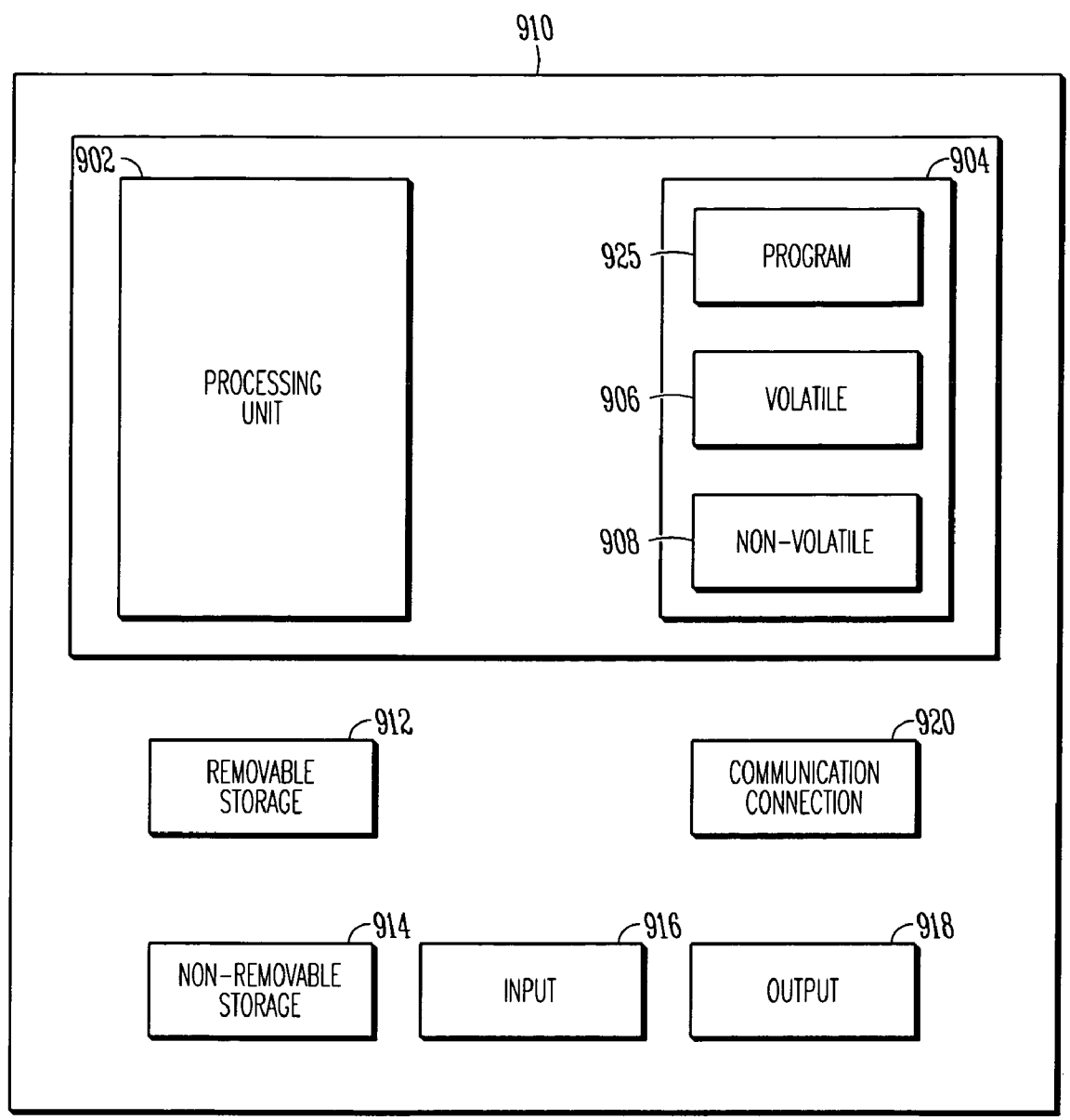
FIG. 7 is a representation of a computing system, according to an example embodiment.

A block diagram of a computer system that executes programming for performing the above algorithm is shown in FIG. 7. A general computing device in the form of a computer 910, may include a processing unit 902, memory 904, removable storage 912, and non-removable storage 914. Memory 904 may include volatile memory 906 and non volatile memory 908. Computer 910 may include—or have access to a computing environment that includes—a variety of computer-readable media, such as volatile memory 906 and non volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor 210 (see FIG. 2), the controller 430 (see FIG. 4), or the controller 530 (see FIG. 5) may be such a computer system.

Computer-readable instructions stored on a computer-readable medium are executable by the processing unit 902 of the computer 910. A hard drive, CD-ROM, and RAM are some examples of articles including a computer-readable medium. For example, a computer program 925 executed to control the writing of information associated with successive flush cache commands from a host 440 according to the teachings of the present invention may be included on a CD-ROM and loaded from the CD-ROM to a hard drive. The computer program may also be termed firmware associated with the disk drive 100, 400, 500. In some embodiments, a copy of the computer program 925 can also be stored on the disk 120 of the disk drive 100, 400, 500.

In still other embodiments, a machine-readable medium provides instructions that, when executed by a machine, cause the machine to perform operations including writing information associated with a first cache command to one of a plurality of flush cache memory locations, and writing information associated with a second flush cache command to the another of the plurality of flush cache memory locations. The instructions of the machine-readable medium also cause the machine to perform operations that includes switching between the plurality of flush cache memory locations when storing information associated with successive flush cache commands. The instructions of the machine-readable medium also cause the machine to perform operations that includes writing all the individual write commands associated with a flush cache command from one of the plurality of flush cache memory locations before writing information associated with another flush cache command to the one of the plurality of flush cache memory locations. The instructions of the machine-readable medium also cause the machine to send a signal indicating the completion of a write cache command after writing the information associated with the flush cache command to one of the plurality of flush cache memory locations.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A disk drive comprising:
  a cache memory configured to store write commands received from a host;
  a first flush cache memory location of a plurality of flush cache memory locations, the plurality of flush cache memory locations being configured to store data associated with the write commands in response to a flush cache command;
  a second flush cache memory location of the plurality of flush cache memory locations; and
  a controller configured to write information associated with successive flush cache commands alternately among at least the first flush cache memory location and the second flush cache memory location to avoid overwriting information associated with a prior flush cache command and then write the information from the first and second flush cache memory locations to a disk.

2. The disk drive of claim 1 wherein the first flush cache memory location and the second flush cache memory location are non volatile memory locations.

3. The disk drive of claim 2 wherein the non volatile memory locations are located remotely from a disk of the disk drive.

4. The disk drive of claim 2 wherein the non volatile memory locations are a portion of a write channel associated with the disk drive.

5. The disk drive of claim 2 further comprising a printed circuit board attached to an enclosure of the disk drive, wherein the non volatile memory locations are located on the printed circuit board.

6. The disk drive of claim 2 wherein the non volatile memory locations are two portions of a single non volatile memory device.

7. The disk drive of claim 1 wherein the first flush cache memory location and the second flush cache memory location are located on a disk of the disk drive.

8. The disk drive of claim 1 wherein the first flush cache memory location and the second flush cache memory location are located on a track of a disk of the disk drive.

9. The disk drive of claim 1 wherein the first flush cache memory location and the second flush cache memory location are located on substantially opposite sides of a disk on the disk drive.

10. The disk drive of claim 1, wherein the controller is further configured to issue a signal to the host indicating a completion of the flush cache command after writing the information associated with the flush cache command to one of the plurality of flush cache memory locations.

11. A method of writing information associated with a flush cache command to a disk drive comprising:

writing information associated with a first flush cache command to a first of a plurality of flush cache memory locations;

writing information associated with a second flush cache command to a second of the plurality of flush cache memory locations; and alternating among at least the first and the second of the plurality of flush cache memory locations when writing information associated with the first and the second flush cache commands to avoid overwriting information associated with a prior flush cache command and then write the information from the first and second flush cache memory locations to a disk.

12. The method of claim 11 further comprising:

writing all individual write commands associated with the first flush cache command to the first of the plurality of flush cache memory locations before writing information associated with the second flush cache command to the second of the plurality of flush cache memory locations.

13. The method of claim 11 wherein the plurality of flush cache memory locations corresponds to a number N, and wherein the information associated with a flush cache command includes at least one write command to be written to a specific location on a disk of a disk drive, the method further comprising writing individual write commands designated by a flush cache command to specific locations on the disk before receiving N additional flush cache commands.

14. The method of claim 11 further comprising sending a signal indicating completion of a flush cache command after writing the information associated with the first or the second flush cache command to one of the plurality of flush cache memory locations.

15. The method of claim 11 wherein the plurality of flush cache memory locations are non volatile memory locations.

16. The method of claim 11 wherein the plurality of flush cache memory locations are located on the disk of a disk drive.

17. A machine-readable storage medium that provides instructions that, when executed by a machine, cause the machine to perform operations comprising:

writing information associated with a first flush cache command to one of a plurality of flush cache memory locations;

writing information associated with a second flush cache command to another one of the plurality of flush cache memory locations; and alternating among the plurality of flush cache memory locations when writing information associated with successive flush cache commands to avoid overwriting information associated with a prior flush cache command and then write the information from the first and second flush cache memory locations to a disk.

18. The machine-readable storage medium of claim 17 that provides instructions that, when executed by a machine, further cause the machine to perform operations that further comprise writing all individual write commands associated with the first flush cache command to the one of the plurality of flush cache memory locations before writing the information associated with the second flush cache command to the other one of the plurality of flush cache memory locations.

19. The machine-readable storage medium of claim 17 that provides instructions that, when executed by a machine, further cause the machine to perform operations that further comprise sending a signal indicating completion of a flush cache command after writing the information associated with the first or the second flush cache command to one of the plurality of flush cache memory locations.

* * * * *